United States Patent [19]
Yeomans

[11] 3,715,392
[45] Feb. 6, 1973

[54] PRODUCTION OF DINEO-DICARBOXYLIC ACIDS

[75] Inventor: Betram Yeomans, Hessle, England

[73] Assignee: B P Chemicals Limited, London, England

[22] Filed: Jan. 16, 1970

[21] Appl. No.: 3,535

[30] Foreign Application Priority Data

Feb. 10, 1969   Great Britain......................7,056/69

[52] U.S. Cl.................260/537 R, 260/413, 260/546
[51] Int. Cl...............................................C07c 51/00
[58] Field of Search...................................260/537 R

[56] References Cited

UNITED STATES PATENTS

| | | |
|---|---|---|
| 3,099,687 | 7/1963 | Rohlffs..............................260/533 A |
| 3,202,687 | 8/1965 | Vos et al...........................260/533 A |
| 3,210,404 | 10/1965 | Duri et al..........................260/537 R |

Primary Examiner—Vivian Garner
Attorney—Jacobs & Jacobs

[57] ABSTRACT

Di - neo acids are produced by treating an anhydride of a mono-carboxylic acid, which anhydride contains at least one carbon atom bearing a tertiary hydrogen atom separated from the neo acid group by at least two carbon atoms, with strong acid.

6 Claims, No Drawings

PRODUCTION OF DINEO-DICARBOXYLIC ACIDS

The present invention relates to the production of di-neo carboxylic acids. In this specification by a neo-acid is meant a carboxylic acid in which the alpha carbon atom is attached to four carbon atoms.

The present invention is a process for the production of a di-neo carboxylic acid by treating the anhydride of a mono neo carboxylic acid, which anhydride contains at least one carbon atom bearing a tertiary hydrogen atom, separated from the neo carboxylic acid group by at least two carbon atoms, with strong acid.

The anhydride may be a mixed anhydride or it may be formed from two molecules of the same acid, when it will contain a carbon atom bearing a tertiary hydrogen atom in each carbon chain. In any event it is preferred that the anhydride contains at least two such carbon atoms, one in each chain.

The mono neo carboxylic acid from which the anhydride is prepared preferably contains from nine to 20 carbon atoms, and consequently the anhydride preferably contains 18 to 40 carbon atoms. The carbon atoms bearing the tertiary hydrogen atom and the neo-acid group are separated by at least two, preferably at least four carbon atoms. If the acid contains more than one such carbon atom the nearest one should be at least two, preferably at least four carbon atoms from the acid group.

The anhydride may be prepared by any of the conventional methods for producing anhydrides, for example, by reaction with ketene or acetic anhydride or by heating the acid at about 250°C to 350°C.

The acidic substance may be a Bronsted or a Lewis acid, preferably with a pK value greater than 2, such as hydrofluoric, perchloric, chlorosulphonic, fluorosulphonic or phosphoric or sulphuric acid. The preferred acid is concentrated sulphuric acid, which should be at least 90% w/w, preferably at least 97% w/w. Nitric Acid should not be used as oxidation reactions may occur. Preferred Lewis acids are pentafluoro antimonate in admixture with hydrofluoric acid, boron trifluoride in admixture with phosphoric acid or boron trifluoride in admixture with hydrofluoric acid.

Not less than 1 mole of acid should be used per mole of anhydride. The preferred amount is 5 to 10 moles of acid per mole of anhydride, when using sulphuric acid. With mixtures which react only slowly it may be preferred to use up to 20 moles of sulphuric acid, and it is believed that up to 40 moles is adequate in all cases.

The reaction temperature should not be greater than about 80°C, as oxidative side reactions may occur, and preferably not greater than 60°C. It is particularly preferred to operate at ambient temperatures below 40°C.

The reaction time required is a function of the skeletal structure of the reagents, the reaction temperature and the catalyst used, but it should exceed one second. Reaction times of the order of one hour and more may conveniently be used.

Di-neo acids may be used to make esters which are particularly useful as synthetic lubricant bases, for example. They are also useful in the production of polymers and plasticizers.

The invention is further illustrated in the following example:

EXAMPLE 1

2.2.7. trimethyl octanoic anhydride (0.7236 g, 2.04 mm) and 99 percent sulphuric acid (5 g, 50 mm) were mixed and allowed to stand at ca. 20°C for 0.5h. The reaction mixture was treated with 4 volumes of water and the precipitated 2,2,7,7-tetramethyl suberic acid (m.p. 186°C, wt. 0.100 g ≡ 0.44 mm ≡ 21% yield) was isolated by filtration.

EXAMPLE 2

The use of neo-acid anhydride prepared from polyisomeric neo-acids

The neo-acid anhydride feed (b.p. 162°-170°C/5 mm) was prepared by the reaction of acetic anhydride and neo-tridecanoic acid prepared by a Koch synthesis based on propylene tetramer. The di-neo acid reaction procedure was similar to that employed in Example 1 and the results are given below.

| Run No. | Molar Ratio Used $H_2SO_4$ | Neo-Anhydride | Duration (h) | % Conversion of Anhydride to Di-Neo Acid |
|---|---|---|---|---|
| 1 | 10 | 1 | 3 | 9.4 |
| 2 | 10 | 1 | 6 | 13.4 |
| 3 | 10 | 1 | 24 | 23.5 |
| 4 | 5 | 1 | 24 | 11.4 |
| 5 | 20 | 1 | 3 | 31 |
| 6 | 20 | 1 | 6 | 37 |
| 7 | 20 | 1 | 24 | 63 |
| 8 | 20 | 1 | 48 | 74 |

I claim:

1. A process for the production of a dineo-dicarboxylic acid from 2,2,7-trimethyloctanoic acid anhydride or neotridecanoic acid anhydride respectively, which comprises bringing said anhydride in contact with at least one molar equivalent of a strong acid selected from the group consisting of hydrofluoric acid, perchloric acid, chlorosulphonic acid, fluorosulphonic acid, phosphoric acid, sulphuric acid, pentafluoro antimonate to admixture with hydrofluoric acid, boron trifluoride in admixture with phosphoric acid and boron trifluoride in admixture with hydro-fluoric acid at a temperature no higher than 80°C.

2. A process according to claim 1 wherein the strong acid has a pK value greater than 2.

3. A process according to claim 1 wherein the acid is sulphuric acid of at least 90% w/w concentration.

4. A process according to claim 1 wherein 1 to 40 moles of acid are used per mole of anhydride.

5. A process according to claim 1, wherein said anhydride is 2,2,7-trimethyloctanoic acid anhydride and the dineo-dicarboxylic acid is 2,2,7,7-tetramethyl-suberic acid.

6. A process according to claim 5, wherein the acid is sulphuric acid of at least 90% w/w concentration.

* * * * *